(12) United States Patent
Berdichevsky et al.

(10) Patent No.: US 8,590,903 B2
(45) Date of Patent: Nov. 26, 2013

(54) LIP SEAL WITH INVERSION PREVENTION FEATURE

(75) Inventors: Alexander Berdichevsky, Farmington Hills, MI (US); Rory S. Pawl, Waterford, MI (US); Patrick Scheib, Cornelia, GA (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 429 days.

(21) Appl. No.: 12/410,067

(22) Filed: Mar. 24, 2009

(65) Prior Publication Data
US 2010/0244390 A1 Sep. 30, 2010

(51) Int. Cl.
*F16J 15/32* (2006.01)

(52) U.S. Cl.
USPC .......................... 277/551; 277/549; 277/562

(58) Field of Classification Search
USPC .......................... 277/549, 551, 559, 560, 562
See application file for complete search history.

(56) References Cited

U.S. PATENT DOCUMENTS

| | | | |
|---|---|---|---|
| 2,635,907 A | 4/1953 | Heimbuch | |
| 2,697,623 A | 12/1954 | Mosher | |
| 2,731,284 A | 1/1956 | Chambers, Jr. et al. | |
| 2,736,583 A | 2/1956 | Marvin | |
| 2,736,585 A | 2/1956 | Riesing | |
| 2,736,586 A | 2/1956 | Riesing | |
| 2,743,950 A * | 5/1956 | Helfrecht et al. | 277/561 |
| 2,797,944 A | 7/1957 | Riesing | |
| 3,049,356 A | 8/1962 | Talamonti | |
| 3,356,376 A | 12/1967 | Bradfute et al. | |
| 3,561,770 A * | 2/1971 | Corsi et al. | 277/562 |
| 3,572,734 A | 3/1971 | Holt | |
| 3,685,841 A * | 8/1972 | Keller | 277/571 |
| 3,822,890 A | 7/1974 | Bourgeois | |
| 3,941,396 A | 3/1976 | Bailey et al. | |
| 4,037,849 A | 7/1977 | Thumm | |
| 4,106,781 A | 8/1978 | Benjamin et al. | |
| 4,274,641 A | 6/1981 | Cather, Jr. | |
| 4,344,631 A | 8/1982 | Winn | |
| 4,449,717 A | 5/1984 | Kitawaki et al. | |
| 4,553,763 A * | 11/1985 | Ehrmann | 277/561 |
| 4,585,236 A | 4/1986 | Simmons et al. | |
| 4,635,947 A | 1/1987 | Hatayama | |
| 4,844,484 A * | 7/1989 | Antonini et al. | 277/561 |

(Continued)

FOREIGN PATENT DOCUMENTS

JP 2000320689 11/2000

*Primary Examiner* — Vishal Patel
*Assistant Examiner* — Nicholas L Foster
(74) *Attorney, Agent, or Firm* — Daniel J. Sepanik, Esq.; Harness, Dickey & Pierce, P.L.C.

(57) ABSTRACT

A dynamic shaft seal assembly is provided including a dynamic seal for engaging a rotary shaft. The dynamic seal includes a mounting portion that is mounted within a casing and has an axially extending barrel portion extending from a radially inner end of the mounting portion. The axially extending barrel portion terminates in a radially extending leg portion which extends inwardly from an end of the axially extending portion. A generally conically shaped seal portion extends from an end of the radially extending portion and the seal portion includes a radially inner face engaging the shaft and a radially outer face having a stiffening bead integrally formed thereon. The mounting portion defines a bumper spaced from the axially extending barrel portion by a gap distance that is designed to prevent the seal lip from inverting under sustained high pressure or pressure spikes.

11 Claims, 5 Drawing Sheets

(56) References Cited

U.S. PATENT DOCUMENTS

| | | | |
|---|---|---|---|
| 4,962,936 A * | 10/1990 | Matsushima | 277/364 |
| 4,986,553 A | 1/1991 | Preston et al. | |
| 4,995,621 A | 2/1991 | Devouassoux et al. | |
| 5,004,248 A | 4/1991 | Messenger et al. | |
| 5,085,444 A * | 2/1992 | Murakami et al. | 277/503 |
| 5,292,199 A | 3/1994 | Hosbach et al. | |
| 5,370,404 A | 12/1994 | Klein et al. | |
| 5,509,667 A | 4/1996 | Klein et al. | |
| 5,957,461 A | 9/1999 | Ulrich | |
| 5,967,527 A * | 10/1999 | Fabro et al. | 277/560 |
| 6,428,013 B1 * | 8/2002 | Johnston et al. | 277/400 |
| 6,520,507 B2 * | 2/2003 | Pataille et al. | 277/561 |
| 6,601,855 B1 | 8/2003 | Clark | |
| 6,702,293 B2 * | 3/2004 | Endo et al. | 277/500 |
| 6,860,486 B2 | 3/2005 | Hacker et al. | |
| 7,004,471 B2 | 2/2006 | Bryde et al. | |
| 7,134,669 B2 | 11/2006 | Uhrner | |
| 7,854,433 B2 * | 12/2010 | Berdichevsky | 277/561 |
| 7,963,526 B2 * | 6/2011 | Dahlheimer | 277/564 |
| 2003/0006563 A1 | 1/2003 | Cater et al. | |
| 2003/0230850 A1 | 12/2003 | Bruyere et al. | |
| 2006/0022414 A1 | 2/2006 | Balsells | |
| 2006/0186604 A1 * | 8/2006 | Berdichevsky | 277/559 |
| 2007/0187903 A1 * | 8/2007 | Berdichevsky | 277/559 |
| 2008/0128997 A1 * | 6/2008 | Berdichevsky et al. | 277/366 |
| 2008/0258406 A1 * | 10/2008 | Dahlheimer | 277/569 |

* cited by examiner

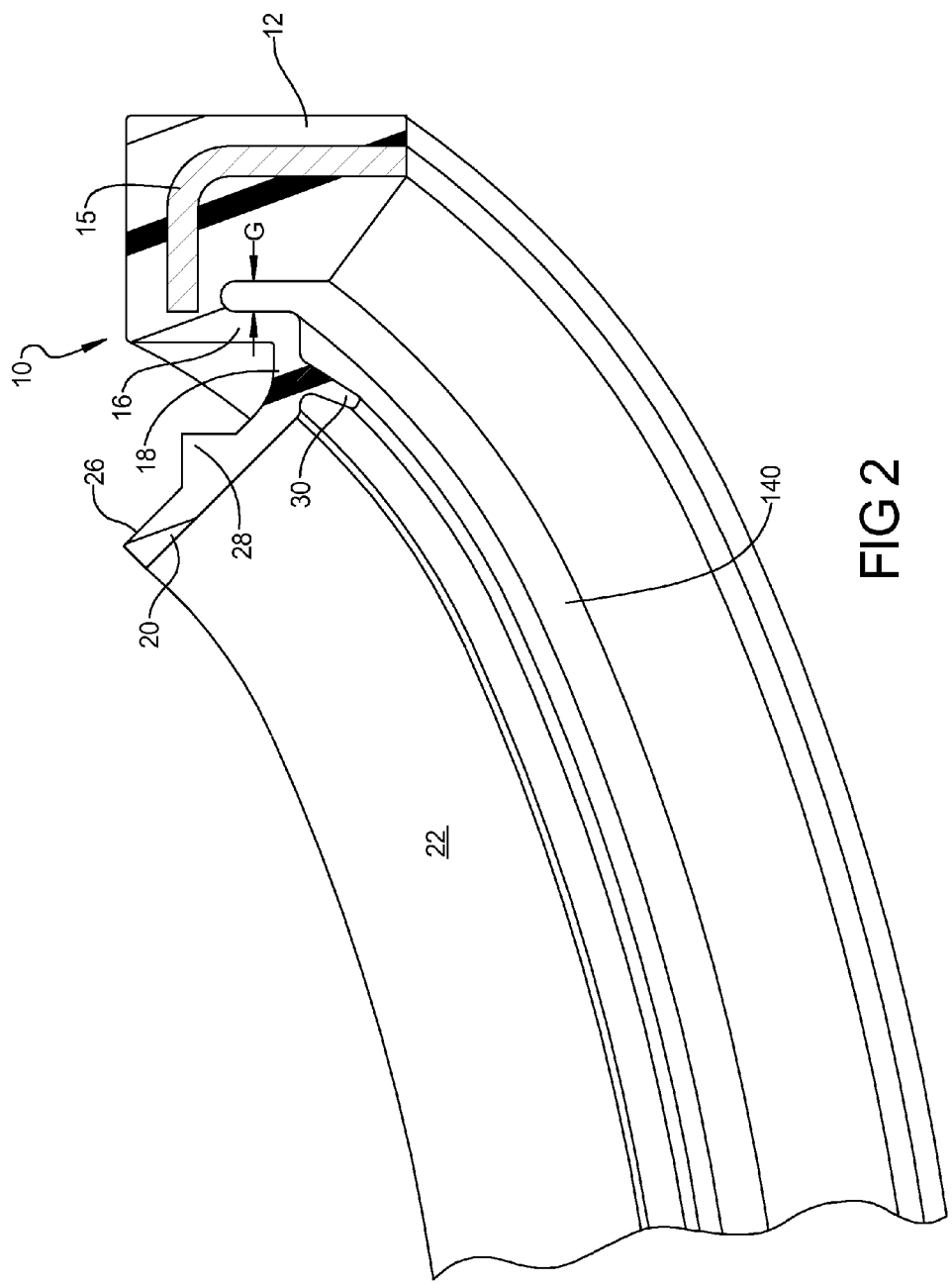

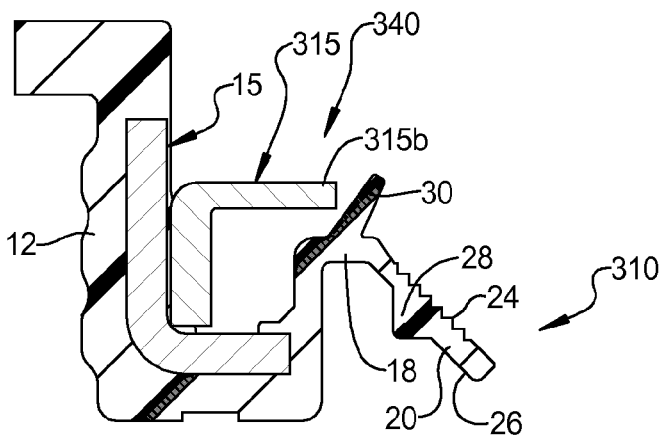
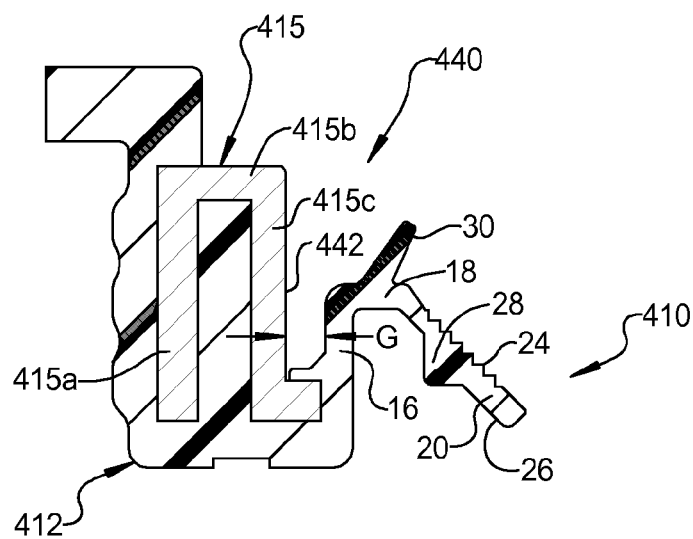
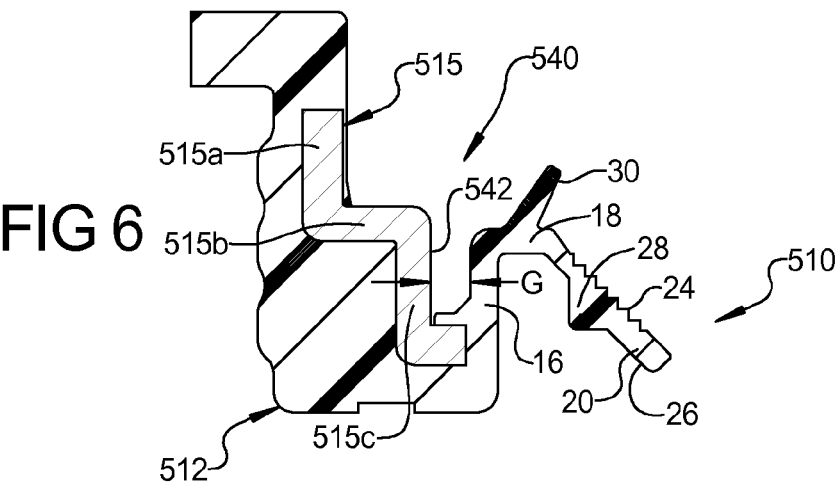

LIP SEAL WITH INVERSION PREVENTION FEATURE

FIELD OF THE INVENTION

The present invention relates to "lay-down" dynamic shaft seals, and more particularly, to a dynamic shaft seal design to reduce the seal's torque, propensity for bell mouthing, and for providing improved shaft followability and improved ability to withstand internal excessive pressure or vacuum. The "lay-down" seal for their function rely on hydrodynamic pumping features as opposed to "standard" or "point-contact" seals that rely primarily on the intrinsic ability of some elastomers to pump in properly designed seals.

BACKGROUND AND SUMMARY OF THE INVENTION

Rotary shaft seals have been utilized in machinery, the automobile industry, as well as other industries. Three major problems associated with seals designed to have substantial contact areas between the shaft and the lip of the seal are "bell mouth," the shaft followability at low temperatures, and oil carbonization in the pumping grooves due to local temperature rise causing increased torque. "Bell mouth" is a phenomenon associated with the lift of the edge of the lip from the shaft. The problem is extenuated for highly incompressible materials, like rubber and PTFE. The ability of the seal to follow the shaft when the shaft either wobbles or is misaligned is also important to a seal design.

The present invention is designed to reduce seal torque, the propensity for "bell mouthing" and also provides for improved shaft followability at low temperatures. The dynamic seal includes an annular mounting portion which is capable of being mounted to a casing which surrounds a rotary shaft. The seal includes an axially extending portion extending from the radially inner end of the mounting portion, with a radially extending portion extending inwardly from an end of the axially extending portion. A generally conically shaped seal portion extends from an end of the radially extending portion with the seal portion including a radially inner face provided with a plurality of grooves or ribs and a radially outer face having a special bead defining a region of increased thickness. The bead acts as an integral spring to control the gap between the essentially conical portion of the seal and the shaft as well as a means for counteracting the "bell mouthing" propensity of the seal portion. The bead can have different shapes including a triangular-cross section or a rounded bead, as well as other configurations which are deemed to be appropriate. The bead is positioned slightly away from the edge of the lip to provide a sufficient lip "lay-down" to properly engage the hydrodynamic pumping features, which would normally be located on the lip contact are between the edge of the seal and the bead. The flexibility of the axially extending portion of the seal provides an improvement in the shaft followability due to the generally cylindrical shape of the axially extending portion having lower bending stiffness. Therefore, if the material of the seal does not have sufficient intrinsic elasticity, making the axially extending portion of the seal in a generally cylindrical shape improves the overall shaft followability. The length and the wall thickness of the cylindrical portion allow one to control the degree of flexibility to match the application requirements.

The mounting portion is provided with a bumper structure to prevent the seal lip from inventing during sustained high pressures or pressure spikes. The bumper is spaced from the axially extending portion by a gap distance that limits the deflection of the axially extending portion to 60 degrees or less from parallel to the central axis. Defined an alternative way, the gap distance G should limit the radially extending portion from becoming parallel to the shaft. The bumper structure can take many forms, as detailed herein.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2 is a cross-sectional view of second embodiment of the dynamic seal according to the principles of the present disclosure;

FIG. 4 is a cross-sectional view of a fourth embodiment of the dynamic seal according to the principles of the present disclosure;

FIG. 5 is a cross-sectional view of a fifth embodiment of the dynamic seal according to the principles of the present disclosure;

FIG. 6 is a cross-sectional view of a sixth embodiment of the dynamic seal according to the principles of the present disclosure.

DETAILED DESCRIPTION OF THE PREFERRED EMBODIMENTS

The following description of the preferred embodiment(s) is merely exemplary in nature and is in no way intended to limit the invention, its application, or uses.

Figure 1:
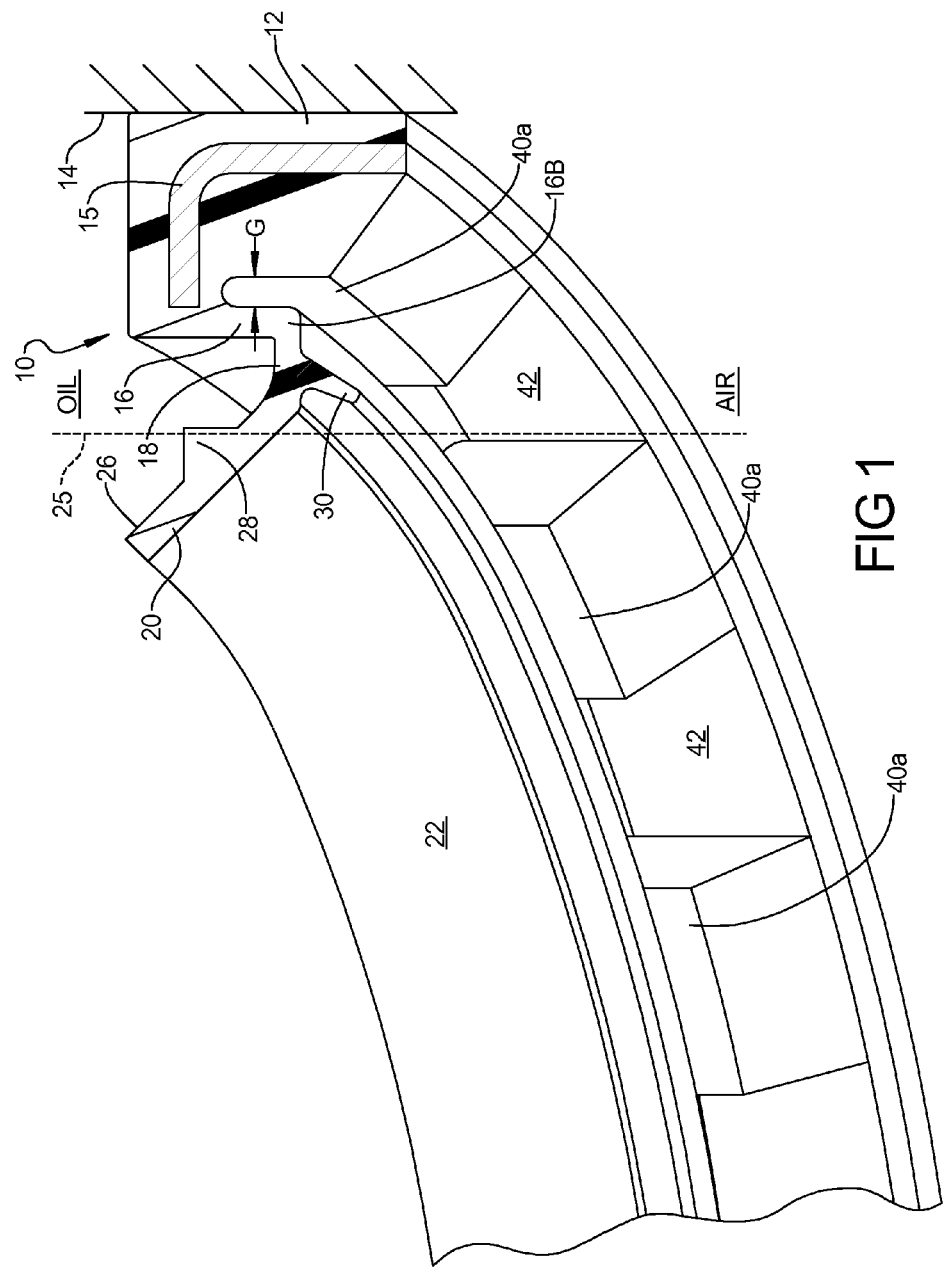
FIG. 1 is a detailed cross-sectional view of the dynamic seal according to the principles of the present disclosure.

With reference to FIG. 1, a dynamic seal 10, according to the principles of the present disclosure, will now be described. The dynamic seal 10 includes a mounting portion 12 which is designed to be engaged within a bore of an outer housing 14. It should be noted that the mounting portion 12 can take on many shapes and can include an insert 15 which can be made from metal or plastic or other rigid material and can have an "L" or other cross-sectional shape.

The dynamic seal 10 includes an axially extending barrel portion 16 extending from a radially inner end 12A of the mounting portion 12. The axially extending barrel portion 16 is preferably generally cylindrical in shape although other shapes, such as conical or a convoluted curve shape, can also be utilized. The dynamic seal 10 includes a radially extending portion 18 extending inwardly from a distal end 16B of the axially extending barrel portion 16. A generally conically shaped seal portion 20 extends from a radially innermost end 18A of the radially extending portion 18. The axially extending barrel portion 16 extends in a first axial direction from mounting portion 12, while the generally conically shaped seal portion 20 extends from the radially innermost end 18A of radially extending portion 18 in an axial direction opposite to the first axial direction. The seal portion 20 includes a radially inner face 22 which may be provided with a plurality of grooves 24. The grooves 24 can be helical in shape or can take other known forms. The grooves 24 provided in the radially inner surface 22 of the seal portion 20 are capable of retaining oil therein in order to provide lubrication between the dynamic shaft seal 10 and a rotary shaft 25 and also can provide a pumping function for returning leaked oil to the oil side of the seal. A radially outer face 26 of the conically shaped seal portion 20 can be provided with a stiffening bead 28 defining a region of increased thickness. The stiffening bead 28 can have different shapes, including a triangular shape, as shown, or can have rounded or other shape configurations. The stiffening bead 28 is positioned slightly away from the end edge 20A of the lip 20 to allow a proper contact area to develop. The bead 28 serves as an integrally formed spring for biasing the sealing lip 20 against the rotary shaft 25 for counteracting bell mouthing of the sealing lip 20. Normally, the seal lip-free edge faces the oil side. However, reverse mounting is also possible. In that case, the design of the spiral grooves have to be accommodated appropriately to pump in the direction of the oil sump.

The improvement in the shaft followability of the dynamic seal 10 is provided by the axially extending barrel portion 16. The generally cylindrical shape of the barrel portion 16 has a lower bending stiffness than other structures; therefore, the axially extending barrel portion 16 is able to readily account for a wobbling shaft 25 or a shaft 25 that is out of center relative to the housing 14.

It should be noted that if desired or advantageous in a particular application, the dynamic shaft seal 10 of the present disclosure can optionally include one or more axial or radial dirt protective lips 30 as are known in the art, one of which is shown, for example, in FIG. 1. The optional dirt protective lip 30 can be formed integrally with the dynamic shaft seal, or can be formed separately therefrom and attached thereto, and can have any of a number of shapes or configurations, as is also known in the art. In addition, the lip 30 can protrude transversely from the dynamic shaft seal in any of a number of directions, including, but not limited to, the exemplary angular relationship protruding generally radially away and axially away from the shaft-engaging sealing components, as shown, for example, in FIG. 1.

The radially extending leg portion 18 can be straight, as shown, or alternatively, can be provided with a convoluted shape. As illustrated in FIG. 2, the generally conically shaped seal portion 20 is designed to take on a generally cylindrical form when deformed by the rotary shaft 14 and the leg 18 is designed to apply pressure to the heel portion 32 of the seal portion 20. The leg portion 18 acts radially on the end 16A of the barrel portion 16 which has a length sufficient to allow the barrel portion 16 to flex radially inwardly and outwardly to accommodate for shaft wobble or shaft misalignment. The length of the leg portion is derivative from the length of the seal portion, the amount of the seal-to-shaft interference, and the distance between the casing and the shaft.

The dynamic shaft seal 10 of the present invention can be utilized for isolating an oil environment from an air environment disposed on either side of the dynamic seal 10. In order to optimize the seal design, the length of the seal portion 20 and the stiffness of the bead 28 (geometry, thickness, material, etc.) are specifically chosen for particular applications. Furthermore, the thickness of the radially extending leg portion 18 is also specifically designed to provide sufficient pressure on the heel 32 of the seal portion 20. The thickness and length of the barrel portion 16 should also be specifically designed to accommodate the requisite flexibility of a particular application. The seal material composition for the dynamic seal can include plastic, rubber, or any of a wide variety of known elastomers, such as PTFE, TPE (thermoplastic elastomers), TPV (thermoplastic vulcanizates), and Flouroprene™ material, a composition described in U.S. Pat. No. 6,806,306. An additional embedded spring in the bead may be utilized in order to extend the life of the seal due to the fact that creep can occur in thermoplastic or elastomeric materials which prevents the material from regaining its original properties. The spring would then provide an additional radial load on the seal surface that the thermoplastic material is incapable of maintaining over a long life. The spring can also improve the robustness of the seal required in contaminated environments. Instead of imbedding, the spring can be placed in a specially designed and manufactured spring groove after completion of the molding operation (as is normal with other radial lip seals).

A bumper portion 40 is disposed on the mounting portion 12 and is spaced radially outward from the axially extending barrel portion 16 by a gap distance G. With the design of the present disclosure, the dynamic seal 10 is capable of withstanding excessive internal pressure or vacuum. In the case of excessive internal pressure being applied to the dynamic seal 10, the axially extending barrel portion 16 which radially overlaps the seal portion 20 provides a radial spring acting upon the radially extending portion 18 to limit the deformation in the seal portion 20. The axially extending barrel portion 16 contacts the bumper portion 40 that limits the axial movement of radially extending portion 18, thus limiting the axial movement of the seal portion 20 to prevent inversion thereof. The bumper portion 40 can be integrally formed from the seal material as a series of discrete bumpers 40a having a space 42 disposed between adjacent bumpers, as illustrated in FIG. 1. Alternatively, the bumper 140 can be formed as a continuous bumper around the circumference of the dynamic seal 110, as illustrated in FIG. 2. The gap spacing G between the axially extending barrel portion and the bumper portion 40,140 is designed to allow limited radial movement of the radially extending portion 18 while preventing sufficient radial movement to permit the seal lip 20 from being inverted (i.e. flipped up-side-down) under sustained high pressures or pressure spikes. Preferably, the gap distance G limits the deflection of the axially extending portion to 60 degrees or less from parallel to the central axis. More particularly, the gap distance G limits the deflection of the axially extending portion to less than 45 degrees, and even more particularly to less than 30 degrees from parallel to the central axis. Defined an alternative way, the gap distance G should limit the radially extending portion 18 from becoming parallel to the central axis.

Figure 3A:
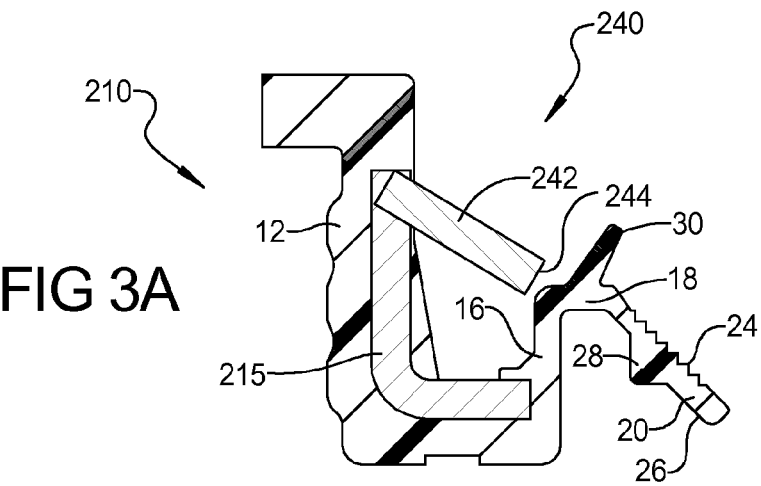
FIGS. 3A-3C illustrate a cross-sectional view of a third embodiment of the dynamic seal according to the principles of the present disclosure.
Figure 3B:
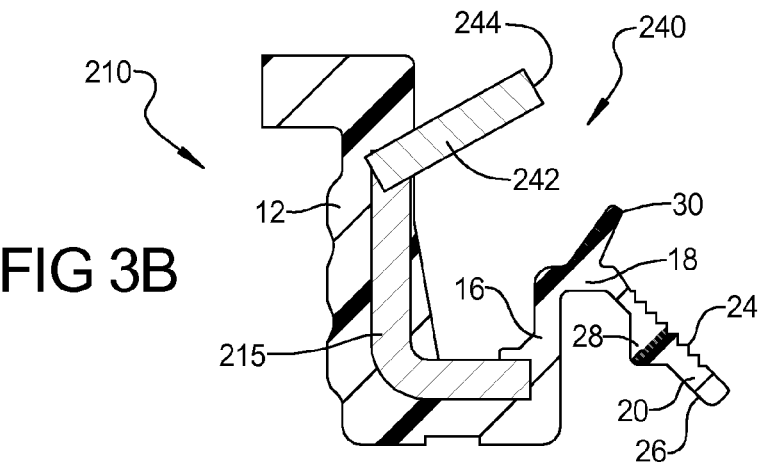
Figure 3C:
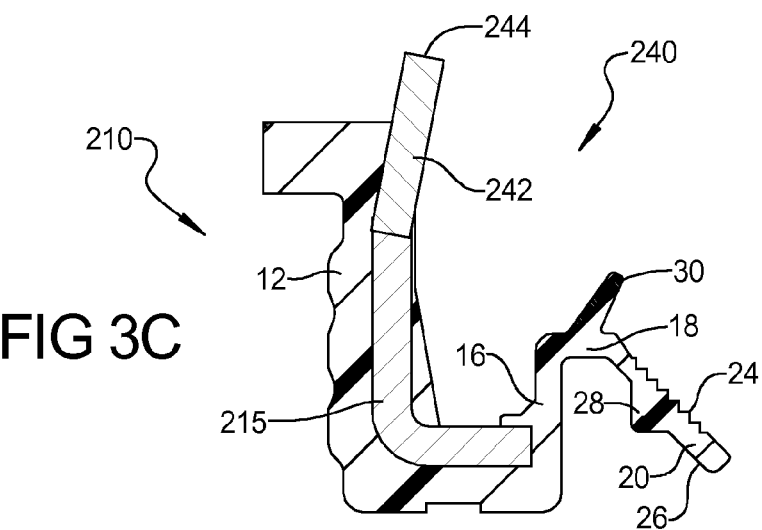

As a further alternative, as illustrated in FIGS. 3A-3C, a bumper structure 240 for a dynamic seal 210 can be formed by the insert case 215. In particular, the insert case 215 can include an arm portion 242 which can be extended axially from the insert case 215 during the molding process and can be subsequently bent radially inward as illustrated by FIG. 3B to a final position as illustrated in FIG. 3C, wherein a gap G is provided between an end portion 244 of the arm portion 242 and the distal end 16A of the axially extending portion 16 of the dynamic seal 210. The arm portion 242 acts as a bumper to limit the radial movement of radially extending portion 18, thus limiting the axial movement of the seal portion 20 to prevent inversion thereof. It should be noted that the arm portion 242 can be a continuous radially inwardly extending ring, or a series of discrete tabs that are spaced from one another.

As a further alternative, as illustrated in FIG. 4, a bumper structure 340 for a dynamic seal 310 can be formed by a secondary insert case 315 that is received inside insert 15. The secondary insert case 315 can be L-shaped and can include an axially extending portion 315a and a radially inwardly extending portion 315b. The axially extending portion 315a is friction fit within L-shaped insert 15. The radially inwardly extending portion 315b of the secondary insert case 315 is spaced from the radially extending portion 18 of the seal by a gap distance G, as defined herein. The radially inwardly extending portion 315b defines a bumper to limit movement of the radially extending portion 18 to prevent inversion of the seal portion 20.

As a further alternative, as illustrated in FIG. 5, a bumper structure 440 for a dynamic seal 410 can be formed by the insert case 415. In particular, the insert case 415 can have a generally "C" shaped cross-section with an outer portion 415a connected to an inner portion 415b by an intermediate radially extending portion 415c. The insert case 415 can be overmolded within the mounting portion 412 of the dynamic seal 410. The inner surface 442 of the inner portion 415b defines a bumper structure 440 spaced from the axially extending portion 16 by a gap distance G as defined, to limit the radial movement of the radially extending portion 18 to prevent inversion of the seal lip 20.

As a further alternative, as illustrated in FIG. 6, a bumper structure 540 for a dynamic seal 510 can be formed by the insert case 515. The insert case 515 can include an axially extending outer portion 515a, a radially inwardly extending portion 515b, and an axially extending inner portion 515c. The inner portion 515c of the insert case 515 defines an inner surface 542 that provides a bumper structure 540 spaced from the axially extending portion 16 by a gap distance G, as defined, to limit the radial movement of the radially extending portion 18 to prevent inversion of the seal lip 20.

Figure 7:
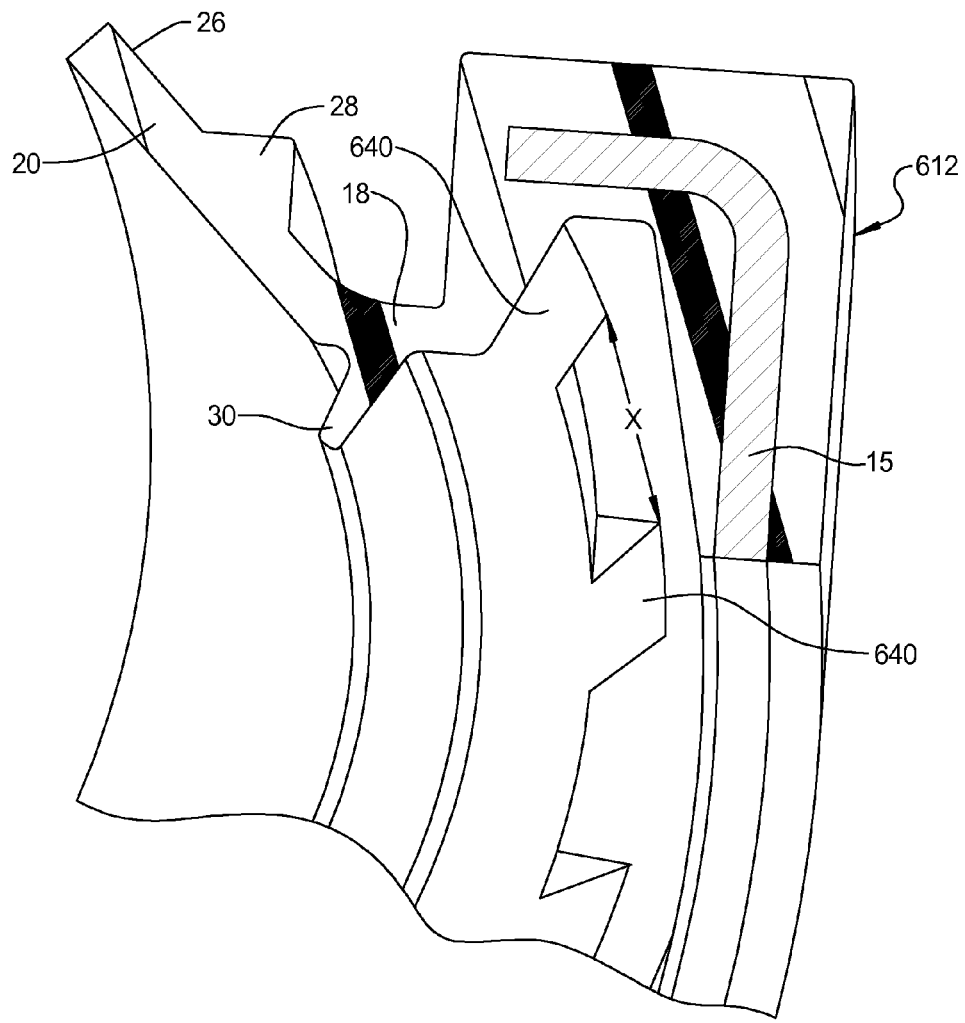
FIG. 7 is a cross-sectional view of a seventh embodiment of the dynamic seal according to the principles of the present disclosure.

As a further alternative, as illustrated in FIG. 7, a series of reinforcing gussets 640 are provided for strengthening the axially extending portion 616 of the dynamic seal 610. The gussets 640 can be spaced from each other by a distance x and are formed on the radially outer side of the axially extending portion 616. The gussets 640 reinforce the axially extending portion 616 to limit the radial movement of the radially extending portion 18 to prevent inversion of the seal lip 20.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A dynamic seal assembly, comprising:
   an outer housing defining a bore and having an air side and an oil side;
   a shaft rotatably received in said bore;
   a seal received in said bore and engaging said shaft, said seal separating said air side from said oil side, said seal including:
   an annular mounting portion;
   an axially extending portion having first inner and outer surfaces each extending in a first axial direction from said annular mounting portion and parallel to a central axis of said annular mounting portion in an un-installed state, said first outer surface of said axially extending portion being cylindrical, said first axial direction extending away from the oil side of said dynamic seal, said mounting portion defining a bumper having a cylindrical inner surface spaced radially outward from and parallel to said cylindrical outer surface of said axially extending portion by a gap distance;
   a radially extending portion having second inner and outer surfaces each extending radially inwardly from an end of said axially extending portion and entirely perpendicular to said central axis in an un-installed state;
   a generally conically shaped seal portion extending from an end of said radially extending portion toward the oil side of the dynamic seal and in a direction opposite said first axial direction, said seal portion including a radially inner face engaging said shaft and having a seal lip free edge facing said oil side of said dynamic seal, wherein said gap distance prevents the axially extending portion from deflecting more than 60 degrees from parallel with the central axis, wherein said bumper, said axially extending portion and said generally conically shaped seal portion are each made from a same material.

2. The dynamic seal assembly according to claim 1, wherein said radially inner face of said seal portion is provided with at least one groove.

3. The dynamic seal assembly according to claim 1, wherein said seal is made from an elastomeric material.

4. The dynamic seal assembly according to claim 1, wherein said seal is made from a plastic material.

5. The dynamic seal assembly according to claim 1, further comprising a dirt lip extending from said radially extending portion toward an air side of said seal.

6. The dynamic seal assembly according to claim 5, wherein said dirt lip is integrally formed with said radially extending portion.

7. The dynamic seal assembly according to claim 1, wherein the composition of said seal includes one of PTFE, thermoplastic elastomer, and thermoplastic vulcanizates.

8. The dynamic seal assembly according to claim 1, wherein said bumper is formed by a plurality of spaced bumper sections.

9. The dynamic seal assembly according to claim 8, wherein said spaced bumper sections are formed from a same material as said seal portion.

10. The dynamic seal assembly according to claim 8, wherein said spaced bumper sections are formed from an insert over-molded within said mounting portion.

11. The dynamic seal assembly according to claim 1, wherein said bumper is formed from a same material as said seal portion.

* * * * *